US010728841B2

(12) United States Patent
El-Moussa et al.

(10) Patent No.: US 10,728,841 B2
(45) Date of Patent: Jul. 28, 2020

(54) DYNAMIC WIRELESS NETWORK ACCESS POINT SELECTION (71) Applicant: British Telecommunications Public Limited Company, London (GB)

(72) Inventors: Fadi El-Moussa, London (GB); Ali Sajjad, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/313,511

(22) PCT Filed: Jun. 5, 2015

(86) PCT No.: PCT/GB2015/051641
§ 371 (c)(1),
(2) Date: Nov. 22, 2016

(87) PCT Pub. No.: WO2015/198014
PCT Pub. Date: Dec. 30, 2015

(65) Prior Publication Data
US 2017/0142649 A1    May 18, 2017

(30) Foreign Application Priority Data

Jun. 27, 2014 (EP) ..................................... 14250088

(51) Int. Cl.
*H04W 48/20* (2009.01)
*H04W 48/16* (2009.01)
(Continued)

(52) U.S. Cl.
CPC .......... *H04W 48/20* (2013.01); *H04B 17/318* (2015.01); *H04L 63/20* (2013.01);
(Continued)

(58) Field of Classification Search
None
See application file for complete search history.

(56) References Cited

U.S. PATENT DOCUMENTS 8,125,946 B2 * 2/2012 Csapo ................... H04W 28/20
370/329
8,463,280 B1 * 6/2013 Lim ...................... H04W 28/26
455/452.1
(Continued)

FOREIGN PATENT DOCUMENTS

EP       2 456 264 A2    5/2012
WO  WO 2008/025003 A2    2/2008

OTHER PUBLICATIONS

International Search Report for corresponding International Application No. PCT/GB2015/051641 dated Aug. 5, 2015; 4 pages.
(Continued)

Primary Examiner — Andrew C Oh
(74) Attorney, Agent, or Firm — Patterson Thuente Pedersen, P.A.

(57) ABSTRACT

A mobile device having a processor, a memory and a wireless network interface, the processor executing an operating system including a network communication library for providing networking services via the wireless network interface and being further arranged to: receive capability information associated with each of plurality of wireless network access points accessible to the mobile device; identify, for a set of networked applications in execution on the mobile device, one or more applications having associated a wireless network capability requirement; and select an access point from the plurality of access points to provide network communication for the mobile device, the access point being selected based on the identified one or more applications and the received capability information, wherein network communication for applications executed (Continued)

by the mobile device having associated a wireless network capability requirement that is incompatible with a network capability of the selected access point are prevented from network communication by the network communication library.

16 Claims, 3 Drawing Sheets

(51) Int. Cl.
*H04W 12/02* (2009.01)
*H04L 29/06* (2006.01)
*H04B 17/318* (2015.01)
*H04W 12/08* (2009.01)
*H04W 88/08* (2009.01)

(52) U.S. Cl.
CPC ........... *H04W 12/02* (2013.01); *H04W 48/16* (2013.01); *H04W 12/08* (2013.01); *H04W 88/08* (2013.01)

(56) References Cited

U.S. PATENT DOCUMENTS

| | | | | |
|---|---|---|---|---|
| 9,271,207 | B1* | 2/2016 | Narendran | H04W 36/14 |
| 2004/0250069 | A1* | 12/2004 | Kosamo | H04L 63/102 |
| | | | | 713/168 |
| 2006/0067214 | A1* | 3/2006 | Ramachandran | H04L 47/115 |
| | | | | 370/229 |
| 2006/0094400 | A1* | 5/2006 | Beachem | H04L 63/101 |
| | | | | 455/410 |
| 2007/0010248 | A1* | 1/2007 | Dravida | H04W 84/18 |
| | | | | 455/435.1 |
| 2007/0081462 | A1* | 4/2007 | Gefflaut | H04W 28/08 |
| | | | | 370/235 |
| 2010/0235620 | A1* | 9/2010 | Nylander | H04L 63/20 |
| | | | | 713/151 |
| 2011/0289564 | A1* | 11/2011 | Archer | G06F 21/40 |
| | | | | 726/5 |
| 2012/0076117 | A1 | 3/2012 | Montemurro et al. | |
| 2013/0107706 | A1* | 5/2013 | Raleigh | H04L 41/0806 |
| | | | | 370/230 |
| 2014/0098671 | A1* | 4/2014 | Raleigh | H04W 28/08 |
| | | | | 370/235 |
| 2014/0122703 | A1* | 5/2014 | Pugh | H04L 67/22 |
| | | | | 709/224 |
| 2014/0273950 | A1* | 9/2014 | Li | G06F 3/0481 |
| | | | | 455/410 |
| 2014/0282823 | A1* | 9/2014 | Rash | H04L 63/20 |
| | | | | 726/1 |
| 2014/0355522 | A1* | 12/2014 | Diab | H04W 88/06 |
| | | | | 370/328 |
| 2014/0372293 | A1* | 12/2014 | Leung | H04L 12/1435 |
| | | | | 705/40 |
| 2015/0031326 | A1* | 1/2015 | Begin | H04W 24/08 |
| | | | | 455/405 |
| 2015/0036672 | A1* | 2/2015 | Kim | H04W 48/18 |
| | | | | 370/338 |
| 2015/0065133 | A1* | 3/2015 | Cui | H04W 36/30 |
| | | | | 455/436 |
| 2015/0085746 | A1* | 3/2015 | Somayazulu | H04W 48/08 |
| | | | | 370/328 |

OTHER PUBLICATIONS

Written Opinion of the International Searching Authority for corresponding International Application No. PCT/GB2015/051641 dated Aug. 5, 2015; 7 pages.

* cited by examiner ed on 5 Jun. 2015,
DYNAMIC WIRELESS NETWORK ACCESS POINT SELECTION

CROSS-REFERENCE TO RELATED APPLICATIONS

The present application is a National Phase entry of PCT Application No. PCT/GB2015/051641, filed on 5 Jun. 2015, which claims priority to EP Patent Application No. 14250088.3, filed on 27 Jun. 2014, which are hereby fully incorporated herein by reference.

TECHNICAL FIELD

The present disclosure relates to the selection of a wireless network access point for a mobile device. In particular, it relates to the dynamic selection of an access point.

BACKGROUND

Wireless network access facilities, such as Wi-Fi networks and the like, are provided in public and private locations to deliver network connectivity services to mobile devices present or passing through a location. A wireless access point is a device or suite of devices for providing mobile devices with a mechanism for connecting to a network, such as a wired network, using Wi-Fi or similar standards. An access point can be connected to, or an integral part of, another network device such as a network switch or router. For example, access points can be implemented in accordance with the IEEE 802.11 standards which detail media access control and physical layer specifications for implementing wireless local area network.

Wireless access to a network via an access point has special security considerations. The security of many wired networks is based on physical access control such that devices physically connected to a network enjoy an increased level of trust since physical access to the network can be controlled. In contrast, wireless access points offer network access transcending physical access control measures and conceivably anybody within range of an access point can seek to attach to a network. Furthermore, network traffic communicated between a connecting device and a wireless network access point is susceptible to interception due to the wireless nature of communication, such as network communication transmitted by radio frequency signal.

Accordingly, mobile device users are encouraged to exercise caution when connecting to wireless access points depending upon the nature of their use of a network. Sensitive and/or private network traffic, such as internet banking details, are preferably communicated via an encrypted network connection. In contrast, other applications, such as web browsing, may suitably employ communications via unprotected network connections. Increasingly, users are able to select from a list of multiple available and accessible wireless access points at a particular location, especially in busy, built-up, commercial, retail or industrial centers. Users may make access point selection from a set of access points based on wireless access point capability information provided by their mobile device, though many mobile devices fail to clearly indicate such capability information for users.

Capabilities of access points can vary considerably. Access points may provide no encryption or interception detection at all, in which case all traffic between the access point and the network is open to interception, disclosure to third parties, modification and spoofing. Where security measures are provided, the extent and effectiveness of such measures can vary. Wired Equivalent Privacy (WEP) security is a security facility employed by early wireless networks based on a shared secret and cyclic redundancy checks. The WEP security standard is widely acknowledged to provide a relatively low-level of security that is susceptible to attack due to inherent security weaknesses. Wi-Fi Protected Access (WPA) is a stronger standard of security for wireless communication and can employ a temporal key integrity protocol (TKIP) including dynamically generated 128-bit per-packet keys with message integrity checking superior to cyclic redundancy checks. Yet higher levels of security are provided by Wi-Fi Protected Access 2 (WPA2) which employs a counter mode cipher block chaining authentication protocol (CCM mode protocol, or CCMP) conforming to an Advanced Encryption Standard (AES) specified by the U.S. National Institute of Standards and Technology (NIST). Other existing or contemplated security facilities may also be applied for wireless access points.

It is known to select an access point for a mobile device from a set of available access points on the basis of rules or policies of the mobile device. For example, US patent publication US 20120076117 describes a method for discovering and selecting a wireless network access point based on retrieved capabilities of access points compared to capability requirements. Typically such rules apply preferences to favor more proximate or higher performing (in terms of data rate) access points. Conceivably such rules can also favor access points on the basis of supported security facilities (standards of encryption and the like). Such rules lead to a trade-off for a device: either high security access points are favored at the expense of network performance with the consequence that low-security high-performance access points are not used; or performance is favored at the expense of security with the consequence that a mobile device is vulnerable to attack or is not applied across its full breadth of function due to potentially insecure network communication. Thus it would be advantageous to provide improved access point selection without the aforementioned disadvantages.

SUMMARY

The present disclosure accordingly provides, in a first aspect, a wireless access point selection method for a mobile device with a wireless network connection capability, the mobile device executing an operating system including a network communication library, the method comprising: receiving capability information associated with each of a plurality of wireless network access points accessible to the mobile device; identifying, for a set of networked applications in execution on the mobile device, one or more applications having associated a wireless network capability requirement; and selecting an access point from the plurality of access points to provide network communication for the mobile device, the access point being selected based on the identified one or more applications and the received capability information, wherein network communication for applications executed by the mobile device having associated a wireless network capability requirement that is incompatible with a network capability of the selected access point are prevented from network communication by the network communication library.

The present disclosure accordingly provides, in a second aspect, a mobile device having a processor, a memory and a wireless network interface, the processor executing an operating system including a network communication library for providing networking services via the wireless network interface and being further arranged to: receive capability information associated with each of plurality of wireless network access points accessible to the mobile device; identify, for a set of networked applications in execution on the mobile device, one or more applications having associated a wireless network capability requirement; and select an access point from the plurality of access points to provide network communication for the mobile device, the access point being selected based on the identified one or more applications and the received capability information, wherein network communication for applications executed by the mobile device having associated a wireless network capability requirement that is incompatible with a network capability of the selected access point are prevented from network communication by the network communication library.

The present disclosure accordingly provides, in a third aspect, a computer program element comprising computer program code to, when loaded into a computer system and executed thereon, cause the computer system to perform the method set out above.

Thus embodiments of the present disclosure provide selection of a wireless network access point from a plurality of accessible access points based on applications executed by the mobile device. Applications have associated capability requirements defining facilities, services or resources of an access point preferred for the operation of the applications and for use as a basis for selection of an access point. Applications executed having a capability requirement that is not satisfied or compatible with a capability of a selected access point are prevented from network communication via the selected network access point by the network communication library executing with an operating system of the mobile device. Thus, in this way, a security requirement for an application in execution initially informs a selection of an appropriate wireless access point and subsequently, such as for applications executed subsequent to such access point selection, provides a basis for network access control for applications so as to prevent applications requiring secure network communication from communicating over unsecured networks. Accordingly a user of a mobile device enjoys the benefits of potentially higher-performing access points (such as more proximate access points, access points for which signal strength or data rate is greater) while assuring security for applications executing or to be executed on the mobile device requiring a capability, such as a standard of security, greater than that provided by a selected access point.

In one embodiment the method further comprises, in response to an identification of a change to the set of networked applications in execution on the mobile device, repeating the receiving, identifying and selecting. Thus the execution of new applications subsequent to the selection of an access point can lead to a re-assessment of appropriate access point selection based on currently executing applications. Such repeating of the receiving, identifying and selecting can be postponed, such as for a predetermined, learned or user configurable period, or until a threshold number of network access or communication attempts has been made by a newly executed application.

In one embodiment the method further comprises periodically repeating the receiving, identifying and selecting. Thus the selection of a network access point based on applications in execution can be revisited and revised on a periodic basis to provide a balance between high capability access points (e.g. access points providing higher security services or standards) and higher performing access points (e.g. access points providing higher data rates or relative signal strength at the mobile device).

In one embodiment the method further comprises: identifying a subset of the set of applications in execution as a set of applications in active use by a user of the mobile device, and wherein the selecting is based on the identified set of applications in active use. Thus the selection of an appropriate access point can be informed by a set of applications in execution that are also in active use. Such active use can be determined based on, inter alia: user interaction with such applications, such as by way of user interface interaction; a measure of processor or other mobile device resource usage by the application, where greater resource usage can be indicative of active use of an application; or based on a detection of network communication by the application with reference to the network communication library.

In one embodiment the capability information for a wireless access point indicates one or more of: an encryption status; an encryption standard; and a data rate of the access point. Additionally or alternatively, the wireless network capability requirement associated with one or more applications includes one or more of: an encryption status; an encryption standard; and a data rate of the access point.

In one embodiment the access point is selected based on a comparison of the wireless network capability requirement associated with applications and the capability information for the wireless access points.

In one embodiment the method further comprising determining a measure of relative signal strength for each of the plurality of wireless access points based on a power level received by an antenna of the mobile device for a radio signal transmitted by the access point, wherein the capability information for each of the plurality of wireless access points is supplemented by the measure of relative signal strength, and wherein the wireless network capability requirement associated with one or more applications includes a measure of relative signal strength.

In one embodiment, selecting an access point from the plurality of access points includes: ranking the applications in execution based on an encryption standard to identify one or more applications requiring a most rigorous encryption standard; comparing the identified most rigorous encryption standard for applications in execution with an encryption standard indicated for each of the wireless access points based on the capability information for the access point; and selecting a wireless access point having an encryption standard at least meeting the most rigorous encryption standard for the applications in execution.

In one embodiment a wireless network capability requirement for an application is determined to be incompatible with a network capability of the selected access point on the basis of the capability of the access point being insufficient to satisfy the requirement of the application. Additionally or alternatively, incompatibility between access point capability and application capability requirement can be determined where the requirements of an application are contrary or opposed to an access point capability. For example, an application requiring encryption is contrary to an access point having no encryption and as such the capability requirement and the capability of the access point are incompatible. Similarly, a data rate capability requirement of an application, such as a media streaming application, may be greater than a data rate capability of an access point. In such situations, embodiments of the present invention are operable to prevent network communication by applications on an individual application basis so as to provide network communication for applications where an access point capability satisfies an application requirement and prevent network communication where the requirement fails to be satisfied. Such an approach provides a balance between access to appropriate access points for applications in execution while, one some embodiments, preventing newly executed applications from using the network, such as until the access point selection method is repeated.

BRIEF DESCRIPTION OF THE DRAWINGS

Embodiments of the present disclosure will now be described, by way of example only, with reference to the accompanying drawings, in which.

DETAILED DESCRIPTION OF THE EMBODIMENTS

Figure 1:
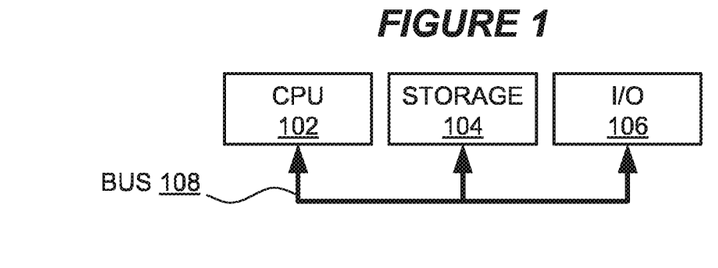
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
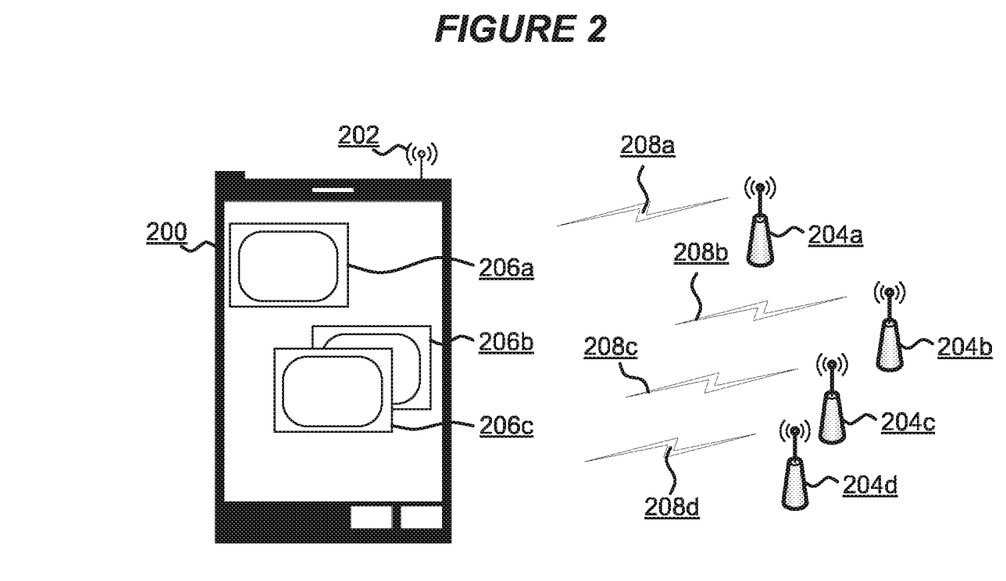
FIG. 2 depicts an arrangement of a mobile device and a plurality of wireless network access points in which embodiments of the present disclosure can be employed.

FIG. 2 depicts an arrangement of a mobile device 200 and a plurality of wireless network access points 204a to 204d in which embodiments of the present invention can be employed. A mobile device 200 is a computing, telecommunications, terminal, pervasive, portable or semi-portable (in the sense that it is moveable and is at least occasionally moved) device having a wireless network connection capability such as by way of a wireless network interface associated with a wireless antenna 202. For example, mobile device 200 is a personal computer, a laptop computer, a tablet computer, a mobile telephone, a smartphone such as an Android, Windows or iOS smartphone, a portable terminal device or any other suitable mobile device with wireless network connection capability. The mobile device 200 is arranged to execute a plurality of networked applications 206 such as software or firmware applications executed by a processor of the device as will be described in detail below. Networked applications 206 are applications employing network facilities of the mobile device for communication via a network. For example, networked applications 206 can include messaging applications, cloud service access applications, email clients, web browsers, financial handling applications such as internet banking applications, mobile shopping applications, informational applications, remote access applications, remote terminal applications, transmission facilities, media applications such as video or audio streaming applications and the like. The mobile device 200 is arranged to receive network capability information for a plurality of wireless network access points 204 being accessible to the mobile device 200. Network access points 204 are devices or combinations or suites of devices for providing wireless network capable mobile devices with a mechanism for connecting to a network, such as a wired network, using Wi-Fi or related standards. An access point 204 can be connected to, or an integral part of, another network device such as a network switch or router. For example, access points 204 can be implemented in accordance with the IEEE 802.11 standards which detail media access control and physical layer specifications for implementing wireless local area network. An access point 204 is accessible to the mobile device 200 if a wireless network signal, such as a radio frequency signal, emitted or transmitted by the access point 204 is received by the mobile device 200 such that the mobile device 200 can engage in network communication with the access point 204.

In use, the mobile device 200 receives capability information from the access points 204a to 204d, such as by way of beacon frames transmitted by the access points 204 in accordance with the IEEE 802.11 standard. A beacon frame is a management frame defined for IEEE 802.11 based wireless networks and contains information about the network. Beacon frames are transmitted 208 periodically to announce the presence of a wireless network accessible via a wireless network access point. A beacon frame indicates, inter alia: wireless network identification information such as a service set identification (SSID); and capability information indicating capabilities of an access point and/or a network to which the access point is connected. The capability information can include an indication of whether an access point supports encryption of network traffic communicated between an access point 204 and a mobile device 200, and where such encryption is supported, a standard of encryption such as an identification of an encryption approach, algorithm, protocol and the like.

In use, the mobile device 200 receives beacon frames transmitted 208 from wireless network access points 204 and seeks to establish a connection to one of the access points 204 to provide network communication for the mobile device 200. The mechanism or such selection in accordance with embodiments of the present disclosure is described below.

Figure 3:
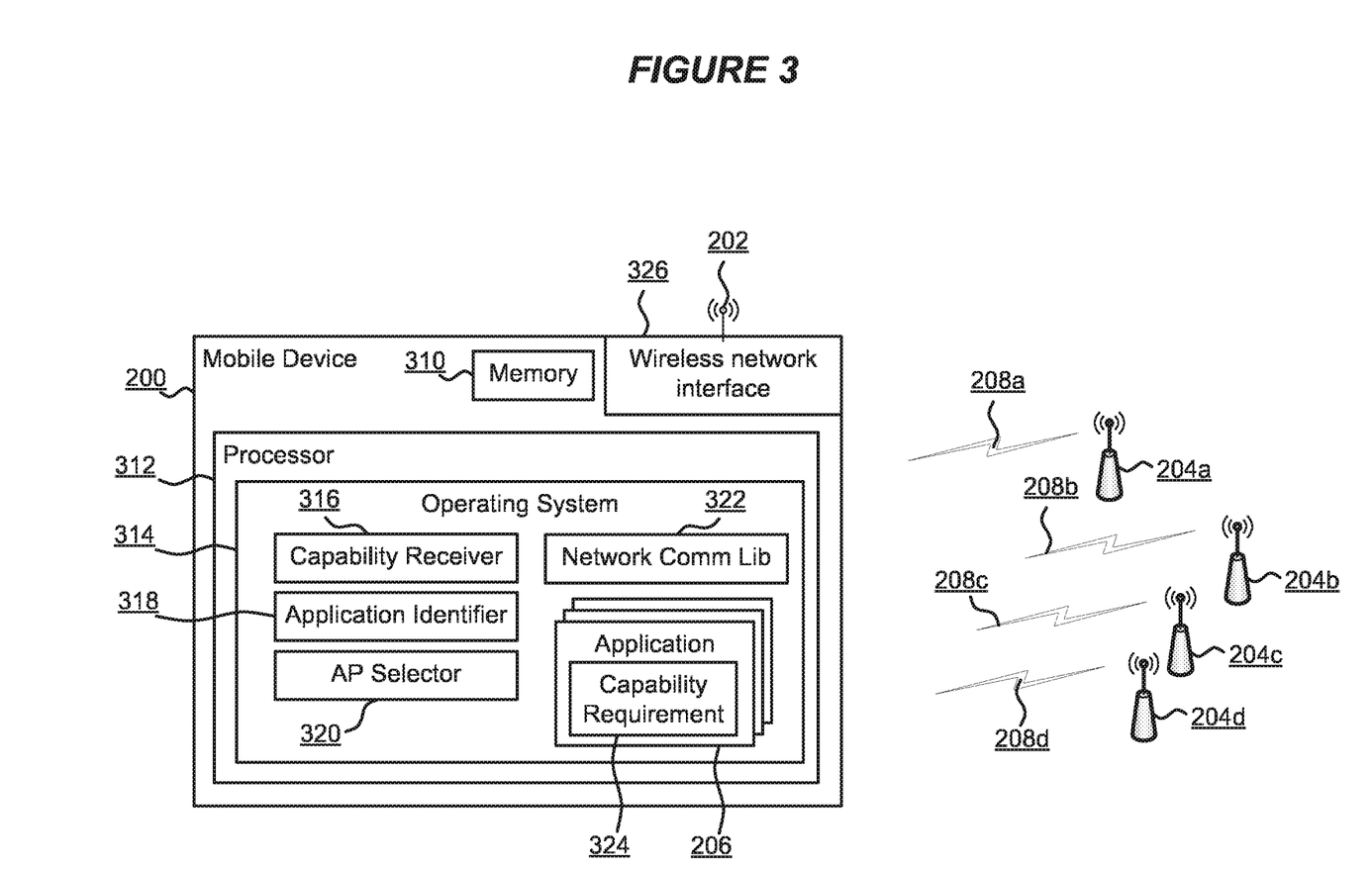
FIG. 3 is a component diagram of a mobile device in accordance with an embodiment of the present disclosure.

FIG. 3 is a component diagram of a mobile device 200 in accordance with an embodiment of the present disclosure. Some of the elements of FIG. 3 are identical to those described above with respect to FIG. 2 and these will not be repeated. The mobile device 200 includes a memory 310 such as a volatile or non-volatile memory, for example a random access memory, a flash memory etc., for the storage of data and/or instructions such as software instructions for the mobile device. The mobile device 200 further includes a wireless network interface 326 such as an embedded Wi-Fi 802.11b/g/n network interface module or network controller, integrated solutions for which are provided by manufacturers such as Murata Manufacturing Co. Ltd and based on network chipsets available from Broadcom Corporation and the like. The wireless network interface is operable with one or more antennae 202 for the transmission and receipt of wireless network communications with access points 204 using, for example, radio frequency signals. In use the wireless network interface 326 is arranged to communicate with a selected one of the wireless network access points 204a to 204d depending on a selection process described in detail below. Thus a selected access point 204 is associated with the wireless network interface 326 for the provision of network communication for the mobile device 200 including all applications 206 executing on the mobile device 200.

The mobile device 200 includes at least one processor 312 such as a microprocessor or a suite of cooperating processors communicatively connected to the memory 310 and wireless network interface 326 via one or more buses or the like. The processor 312 is operable to execute computer software code such as machine code, assembly language code or code in an intermediate, compiled or bytecode form, such as computer software code stored in the memory 310. In particular, the processor is arranged to execute an operating system 314 for the mobile device as a software component for supporting functions of the mobile device 200 such as any or all of, inter alia: booting, loading, starting or otherwise initializing and commencing operation of the mobile device; access to, and management of, the memory 310 and any file storage system such as a file system of the mobile device 200 and/or memory 310; scheduling of tasks, processes, software and applications executed by the processor 312; access to, and management of, hardware, firmware or software facilities and resources of the mobile device 200 such as the network interface 326, input/output facilities such as screen, input devices (e.g. keyboards, touch screens and the like), interfaces such as memory interfaces including memory card interfaces (secure digital (SD) cards etc.), interface ports (universal serial bus (USB) ports etc.), camera devices, audio devices (speakers and microphones), etc.; and software and/or firmware libraries of the mobile device 200 such as communications libraries, user interface libraries, standard libraries for software applications and the like. Examples of operating systems for mobile devices include the Microsoft Windows operating system, Linux operating system or Mac OS operating system for mobile computers; Microsoft Windows Phone operating system, Android operating system or iOS for smartphones; and Microsoft Windows RT, Android operating system or iOS for portable computing devices such as tablet computers.

In accordance with embodiments of the present disclosure, the operating system 314 is arranged to execute one or more of a plurality of networked applications 206, each application 206 having associated one or more wireless network capability requirements 324. The applications 206 are stored in the memory 310 of the mobile device 200, such as by way of software instructions, libraries, executable files, instantiable software objects and the like. Each application 206 can take one of a number of states at a point in time during the operation of the mobile device 200, the states including, inter alia: an unloaded, non-executing or inactive state in which the application 206 is not caused to be loaded for execution by the processor 312; a loaded and executing state of operation in which the application 206 is loaded for execution by the processor 314; an executing state of operation in which the application 206 is not currently in active use, such as an application executing by the processor but not being currently engaged in, or interacting with, a user of the mobile device, such as an application 206 executing in a background, low priority, multi-tasking state of operation, characterized by, for example, no user interaction, low resource consumption (such as processor consumption), no network communication and the like; and an executing state of operation in which the application 206 is currently in active use, such as can be contrasted against an application not in active use as previously described.

Each wireless network capability requirements 324 is an indicator, flag, data structure or identifier for specifying one or more characteristics of a wireless network access point 204 required for the operation of an application 206. For example, the wireless network capability requirement 324 can specify, inter alia: whether an application requires that wireless network communications are encrypted between the mobile device 200 and an access point 204; a particular or minimum standard of encryption between the mobile device 200 and an access point 204, such as WEP, WPA or WPA2 encryption and/or one or more specific characteristics of encryption required by the application, such as a minimum cryptographic key length, a particular message integrity checking mechanism, a particular encryption algorithm or protocol to be employed etc.; a particular or minimum data rate required for an application; a particular or minimum relative or absolute measure of signal quality or strength required for an application; and other wireless network capability requirements as will be apparent to those skilled in the art. While the one or more capability requirements 324 are illustrated in FIG. 3 as being comprised with the application 206 it will be appreciated by those skilled in the art that the capability requirement could alternatively be provided in association with an application 206, such as referenced by the application 206 and stored elsewhere such as the memory 310. Further, one or more applications 206 may have no associated capability requirement (e.g. applications having no particular stipulations as to the capabilities of a wireless network access point).

The operating system 314 further executes or interfaces with a network communication library 322 component as a hardware, software, firmware or combination component for providing networking facilities for software, applications and services executing with or on the operating system 314. For example, the network communication library 322 is one or more classes provided in a class library of an object oriented operating environment or operating system such as the Android Socket class. In a further example, the network communication library 322 is an application programming interface (API) such as the socket API of the iOS operating system; a socket wrapper such as a POSIX (Portable Operating System Interface) socket wrapper, or a static or dynamic library such as the Windows "winsock" dynamic link library. The network communication library 322 accordingly provides network communication facilities and/or functions to or for the operating system 314 and/or software applications 206 executing with, in or on the operating system 314, such as, inter alia and by way of example only: functions to create a transmission control protocol (TCP) socket; functions to transmit and receive data over a created TCP socket; and functions to close a TCP socket.

In accordance with embodiments of the present disclosure the network communication library 322 is further arranged to check one or more wireless network capability requirements 324 associated with an application 206, being in an executing state of operation, that seeks or attempts to employ network services. The network communication library 322 is arranged to prevent network communication by a software application 206 where an application capability requirement 324 is incompatible with one or more capabilities of a wireless network access point 204 being currently selected and associated with the wireless network interface 326 for communication by the mobile device 200. For example, an application 206 having a capability requirement 324 for encrypted wireless network communication would be contrary to, and incompatible with, a selected access point 204 associated with the wireless network interface 326 providing no encryption capability (based on capability information supplied by the access point 204). As such, the capability requirement 324 and the capability of the access point 204 are considered incompatible and the network communication library 322 prevents communication with the application 206. Similarly, a data rate capability requirement 324 of an application 206, such as a media streaming application, may be greater than a data rate capability of an access point 204. In such situations, embodiments of the present disclosure are operable to prevent network communication by applications 206 on an individual application 206 basis so as to provide network communication for applications where an access point 204 capability satisfies an application capability requirement 324 and prevent network communication where the requirement 324 fails to be satisfied.

In one embodiment, the network communication library 322 is an adapted conventional network communication library adapted to provide the above described further checking and preventing functions by providing a subclass of a network communication library 322 class in an object oriented operating environment or operating system 314 of the mobile device, such as a subclass of the Android "socket" class. In an alternative embodiment, the network communication library 322 is provided as a wrapper library wrapping a conventional network communication library to provide the above described further checking and preventing functions.

In accordance with embodiments of the present disclosure, the operating system 314 further executes or interfaces with a capability receiver 316 component as a hardware, software, firmware or combination component for receiving capability information for a plurality of wireless network access points 204. The capability information is transmitted by each wireless access point 204, such as by way of an 802.11 beacon frame as previously described, and received at the wireless network interface 326. Such beacon frames or information derived therefrom are accessible to the capability receiver 316 via the network communication library 322.

The operating system 314 further executes or interfaces with an application identifier 318 component as a hardware, software, firmware or combination component for identifying applications 206 operating in an executing mode of operation on the mobile device 200 and having associated a wireless network capability requirement 324. The application identifier 318 can include, refer to or use an application 206 or process list of the operating system 314 such as a process or task list as is known in the art and commonly available in operating systems (such as the Unix function "ps" for providing a snapshot of currently executing processes for an operating system). In one embodiment, the application identifier 318 identifies all applications 206 operating in an executing mode of operation—i.e. all executing applications 206. In an alternative embodiment, the application identifier 318 identifies a subset of all executing applications 206 as a set of active applications executing on the mobile device 200, such as, inter alia: applications actively consuming processor 312 resource; applications actively engaged in user interaction; applications undertaking network communication; and other indicators of activity of an application 206 as will be apparent to those skilled in the art. For example, activity of an application 206 can be determined by the application identifier 318 with reference to a processor consumption measure associated with task or process information provided by the operating system 314. Alternatively, activity of an application 206 can be determined by the network communication library 322 or a user interface or input/output library associated with the operating system 314.

The operating system 314 further executes or interfaces with an access point selector 320 component as a hardware, software, firmware or combination component for selecting a single access point 204 for association with the mobile device 200 by association with the wireless network interface 326 for providing network communication for the mobile device 200. Such network communication provided for the mobile device 200 is provided for the operating system 314, the network communication library 322 and for any and all executing applications 206 on the mobile device. The access point selector 320 selects an access point from the plurality of access points 204a to 204d based on the applications 206 identified by the application identifier 318. In particular, the access point selector 320 selects an access point based on the wireless network capability requirements 324 associated with applications 206 identified by the application identifier 318 and the capability information received by the capability receiver 316 for the accessible access points 204. In one embodiment, the access point selector 320 selects an access point 204 having capability information indicating that the access point 204 is able to satisfy the capability requirements 324 of all currently executing applications 206. Where there is no access point 204 able to satisfy the capability requirements 324 of all currently executing applications 206, then an access point 204 is selected that is able to satisfy the greatest number of capability requirements 324 of all currently executing applications 206. Alternative methods of prioritizing access points 204 can alternatively be used, and such methods can be user configurable or hard coded for the mobile device. For example, the access point selector 320 can be arranged to select an access point 204 that supports the capability requirements 324 of a greatest number of executing applications 206 such that a minority of applications having capability requirements 324 that are not supported are prevented from network communication by the network communication library 322 as previously described. Alternatively, the access point selector 320 can be arranged to select an access point that supports the capability requirements 324 of a greatest number of executing applications 206 that are determined to be in active use (as hereinbefore described and defined). In a further alternative, the access point selector 320 can be arranged to select an access point that supports the greatest number of capability requirements 324 of executing applications 206 that are determined to be in active use. Other methods and schemes for prioritizing the access point 204a to 204d based on the executing applications 206 identified by the application identifier 318 will be apparent to those skilled in the art.

In one embodiment the access point selector 318 ranks the executing applications 206 based on an encryption standard specified, stipulated or indicated in a capability requirement 324 of each application to identify one or more applications 206 requiring a most rigorous encryption standard. Subsequently, the access point selector 318 compares the identified most rigorous encryption standard with an encryption standard indicated for each of the wireless network access points 204 based on the capability information for the access point 204. Accordingly, in such an embodiment the access point selector 318 is arranged to select an access point 204 having an encryption standard at least meeting the most rigorous encryption standard for the applications 206 in execution, where such an access point is accessible to the mobile device 200.

In one embodiment, the operating system 314 is arranged to determine a measure of relative or absolute signal strength for each of the plurality of wireless access points 204 based on a power level received by the antenna 202 of the mobile device 200 for a radio signal transmitted by the access point 204. For example, such a determination can be made by the network communication library 322 or by software or firmware or hardware logic associated with the wireless network interface 326. In such an embodiment the capability information for each of the plurality of wireless access points 204a to 204d is supplemented by the measure of relative signal strength. Similarly, the wireless network capability requirements 324 associated with one or more applications 206 can include a measure of relative signal strength. Thus in this way the capability requirements 324 of applications can include one or more stipulations of relative or absolute signal strength.

In some embodiments the access point selector 320 is arranged to operate in a repeated manner in response to changes to the operating environment of the mobile device 200, such as in response to changes to the applications 206 in execution and/or the executing applications 206 that are in active use. For example, the application identifier 318 can operate periodically to identifier applications in execution 206 and/or active use and, in response to a detection by the application identifier 318 that a set of executing and/or active applications 206 has changed, the functions of the capability receiver 314, application identifier 318 and/or access point selector 320 can be repeated. In this way changes to the constitution of the set of executing applications 206 can be reflected by a corresponding re-selection of a most appropriate access point by the access point selector 320. Further, in one embodiment, the repeating of the functions of the capability receiver 314, application identifier 318 and/or access point selector 320 can occur periodically or intermittently such as based on a predetermined schedule.

Thus embodiments of the present disclosure provide selection of a wireless network access point from a plurality of accessible access points based on applications executed by the mobile device. Applications have associated capability requirements defining facilities, services or resources of an access point preferred for the operation of the applications and for use as a basis for selection of an access point. Applications executed having a capability requirement that is not satisfied or compatible with a capability of a selected access point are prevented from network communication via the selected network access point by the network communication library executing with an operating system of the mobile device. Thus, in this way, a security requirement for an application in execution initially informs a selection of an appropriate wireless access point and subsequently, such as for applications executed subsequent to such access point selection, provides a basis for network access control for applications so as to prevent applications requiring secure network communication from communicating over unsecured networks. Accordingly a user of a mobile device enjoys the benefits of potentially higher-performing access points (such as more proximate access points, access points for which signal strength or data rate is greater) while assuring security for applications executing or to be executed on the mobile device requiring a capability, such as a standard of security, greater than that provided by a selected access point.

Figure 4:
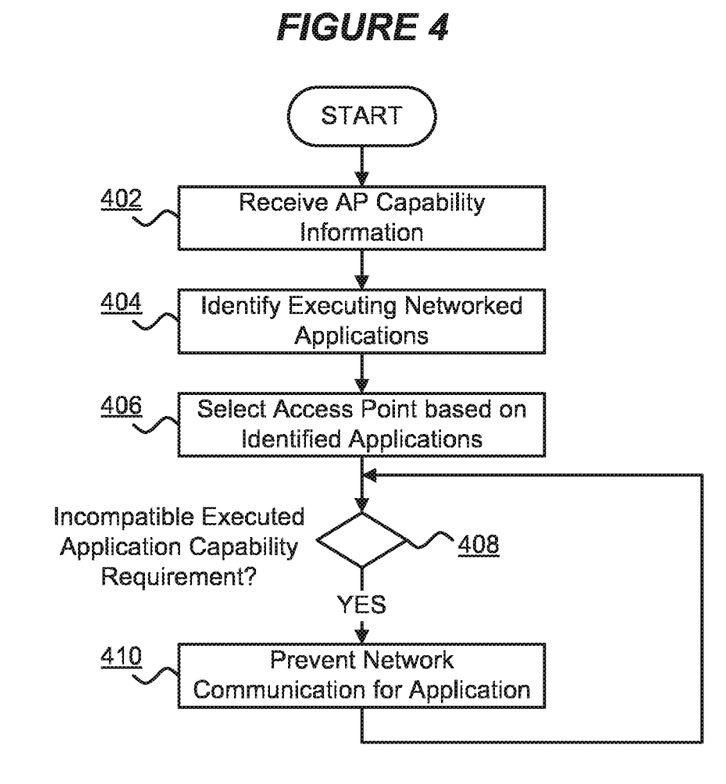
FIG. 4 is a flowchart of a wireless access point selection method for the mobile device of FIG. 3 in accordance with an embodiment of the present disclosure.

FIG. 4 is a flowchart of a wireless access point selection method for the mobile device 200 of FIG. 3 in accordance with an embodiment of the present invention. Initially, at 402, the capability receiver 316 receives capability information from a plurality of wireless network access points 204a to 204d accessible to the mobile device 200. Such capability information can be received in beacon frames transmitted 208 by the access points 204. At 404 the application identifier 318 identifies a set of networked applications 206 in execution on the mobile device 200. In one embodiment the application identifier 318 further identifies applications 206 being in a state of active use. At 406 the access point selector 320 selects an access point 204 from the plurality of access points 204a to 204d to provide network communication for the mobile device 200, the selection being based on the identified one or more applications 206. Specifically, the selection is based on the capability requirements 324 associated with the identified applications 206. At 408 the network communication library 322 determines if an application 206 in execution and/or active use has associated a capability requirement 324 that is incompatible with a capability of the selected access point 204, and where there is an incompatibility, the network communication library prevents network communication for the application 206 at 410. The method generally iterates the checking at 408 such that applications executed after selection of an access point 204 for the mobile device 200 are checked for compatibility of an associated capability requirement 324 with capabilities of the selected access point 204 in order to permit or prevent network communication by the network communication library as appropriate. In this way, applications 206 executed after network access point 204 selection (or between selection and re-selection of an access point) are not able to communicate via an unsuitable network access point due to the checking and prevention of the network communication library 322.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A wireless access point selection method for a mobile device with a wireless network connection capability, the mobile device executing an operating system including a network communication library, the method comprising:
by the mobile device:
receiving capability information associated with each of a plurality of wireless network access points accessible to the mobile device from each of the plurality of wireless network access points;
identifying, for a set of networked applications operating in an executing mode of operation on the mobile device as determined by an application identifier, one or more applications having associated a wireless network capability requirement that comprises an encryption requirement and a data rate requirement; and
selecting an access point from the plurality of access points to provide network communication for the mobile device, the access point being affirmatively selected based on the applications determined by the application identifier and the mobile device determining the access point satisfying the wireless network capability requirements for a greatest number of applications in the set of networked applications,
wherein network communication for applications executed by the mobile device having associated a wireless network capability requirement that is incompatible with a network capability of the selected access point are prevented from network communication by the network communication library, and wherein at least one application having associated a wireless network capability requirement that is compatible with the network capability of the selected access point is allowed network communication by the network communication library.

2. The method of claim 1 further comprising:
identifying a subset of the set of applications in execution as a set of applications in active use by a user of the mobile device,
wherein the selecting is based on the identified set of applications in active use.

3. The method of claim 2 wherein the set of applications in active use is determined based on a detection of network communication by applications in the set of applications in execution with reference to the network communication library.

4. The method of claim 2, wherein the set of applications in active use is determined based on the application identifier determining a processor consumption measure of a task associated with an application.

5. The method of claim 1 wherein the capability information for a wireless access point indicates one or more of: an encryption status; an encryption standard; and a data rate of the access point.

6. The method of claim 1 wherein the wireless network capability requirement associated with one or more applications includes one or more of: an encryption status; an encryption standard; and a data rate of the access point.

7. The method of claim 1 wherein the access point is selected based on a comparison of the wireless network capability requirement associated with applications and the capability information for the wireless access points.

8. The method of claim 1 further comprising determining a measure of relative signal strength for each of the plurality of wireless access points based on a power level received by an antenna of the mobile device for a radio signal transmitted by the access point,
wherein the capability information for each of the plurality of wireless access points is supplemented by the measure of relative signal strength, and
wherein the wireless network capability requirement associated with one or more applications comprises a measure of relative signal strength.

9. The method of claim 1 wherein selecting an access point from the plurality of access points includes:
ranking the applications in execution based on an encryption standard to identify one or more applications requiring a most rigorous encryption standard;
comparing the identified most rigorous encryption standard for applications in execution with an encryption standard indicated for each of the wireless access points based on the capability information for the access point; and
selecting a wireless access point having an encryption standard at least meeting the most rigorous encryption standard for the applications in execution.

10. The method of claim 1 wherein a wireless network capability requirement for an application is determined to be incompatible with a network capability of the selected access point on the basis of the capability of the access point being insufficient to satisfy the requirement of the application.

11. The method of claim 1 further comprising:
in response to an identification of a change to the set of networked applications in execution on the mobile device, repeating the receiving, identifying and selecting.

12. The method of claim 1 further comprising:
periodically repeating the receiving, identifying and selecting.

13. A computer program element comprising computer program code to, when loaded into a computer system and executed thereon, cause the computer system to perform the method as claimed in claim 1.

14. The method of claim 1, wherein the application identifier includes a snapshot of the operating system of the mobile device.

15. The method of claim 1, wherein selecting the access point is further based on the greatest number of wireless network capability requirements satisfied.

16. A mobile device having a processor, a memory and a wireless network interface, the processor executing an operating system including a network communication library for providing networking services via the wireless network interface and being further arranged to:
receive capability information associated with each of plurality of wireless network access points accessible to the mobile device from each of the plurality of wireless network access points;
identify, for a set of networked applications operating in an executing mode of operation on the mobile device as determined by an application identifier, one or more applications having associated a wireless network capability requirement, wherein the wireless network capability requirement comprises an encryption requirement and a data rate requirement; and select an access point from the plurality of access points to provide network communication for the mobile device, the access point being affirmatively selected based on the applications determined by the application identifier and the processor determining the access point satisfying the wireless network capability requirements for a greatest number of applications in the set of networked applications, wherein network communication for applications executed by the mobile device having associated a wireless network capability requirement that is incompatible with a network capability of the selected access point are prevented from network communication by the network communication library, and wherein at least one application having associated a wireless network capability requirement that is compatible with the network capability of the selected access point is allowed network communication by the network communication library.

\* \* \* \* \*